United States Patent
Kohshima

(10) Patent No.: US 10,201,227 B2
(45) Date of Patent: Feb. 12, 2019

(54) SHELVING BRACKET CAPABLE OF ELECTRICAL CONNECTIVITY

(71) Applicant: One by One Co., Ltd., Higashi-Osaka-shi, Osaka (JP)

(72) Inventor: Kuniharu Kohshima, Higashi-Osaka (JP)

(73) Assignee: ONE BY ONE CO., LTD., Higashi-Osaka-Shi, Osaka (JP)

( * ) Notice: Subject to any disclaimer, the term of this patent is extended or adjusted under 35 U.S.C. 154(b) by 0 days.

(21) Appl. No.: 15/567,415

(22) PCT Filed: Nov. 11, 2016

(86) PCT No.: PCT/JP2016/083526
§ 371 (c)(1),
(2) Date: Oct. 18, 2017

(87) PCT Pub. No.: WO2018/087884
PCT Pub. Date: May 17, 2018

(65) Prior Publication Data
US 2018/0289150 A1    Oct. 11, 2018

(51) Int. Cl.
*A47F 5/00*      (2006.01)
*A47B 57/00*    (2006.01)
(Continued)

(52) U.S. Cl.
CPC .......... *A47B 57/425* (2013.01); *A47B 57/404* (2013.01); *A47B 57/42* (2013.01);
(Continued)

(58) Field of Classification Search
CPC ....... H01R 33/18; A47B 57/425; A47B 57/40; A47B 57/404; A47B 57/52; A47B 57/00;
(Continued)

(56) References Cited

U.S. PATENT DOCUMENTS

| | | | | |
|---|---|---|---|---|
| 2,579,704 A | * | 12/1951 | Saul, Jr. | A47F 5/0025 108/110 |
| 10,139,038 B2 | * | 11/2018 | Kohshima | A47F 5/00 |
| 2008/0043456 A1 | * | 2/2008 | Bernardini | A47B 57/42 362/94 |

FOREIGN PATENT DOCUMENTS

| | | |
|---|---|---|
| JP | 10-33290 A | 2/1998 |
| JP | 2008-136685 A | 6/2006 |

(Continued)

OTHER PUBLICATIONS

International Search Report (PCT/ISA/210) dated Jan. 10, 2017, by the Japanese Patent Office as the International Searching Authority for International Application No. PCT/JP2016/083526.
Written Opinion (PCT/ISA/237) dated Jan. 10, 2017, by the Japanese Patent Office as the International Searching Authority for International Application No. PCT/JP2016/083526.

*Primary Examiner* — Vanessa Girardi
(74) *Attorney, Agent, or Firm* — Buchanan Ingersoll & Rooney PC

(57) ABSTRACT

This support apparatus includes a fixation member and a support member attachable to and detachable from an opening portion of the fixation member. A first upper surface portion of the opening portion is formed of: a first front surface portion sloped in a downward direction; and a first rear surface portion formed continuously from the first front surface portion and sloped in an upward direction. A first lower surface portion is sloped in parallel with the first front surface portion. A second upper surface portion of the support member is formed of: a second front surface portion to contact the first front surface portion; and a second rear surface portion to contact the first rear surface portion. A second lower surface portion is sloped in a downward direction, at a slope angle, so as to contact with an opening-side end of the first lower surface portion.

20 Claims, 14 Drawing Sheets

(51) Int. Cl.
*A47B 57/40* (2006.01)
*A47B 57/42* (2006.01)
*A47B 57/50* (2006.01)
*A47B 57/52* (2006.01)
*A47B 96/06* (2006.01)
*F16M 11/04* (2006.01)
*H01R 33/18* (2006.01)
*H01R 13/24* (2006.01)

(52) U.S. Cl.
CPC .............. *A47B 57/50* (2013.01); *A47B 57/52* (2013.01); *A47B 96/06* (2013.01); *A47F 5/00* (2013.01); *F16M 11/04* (2013.01); *H01R 33/18* (2013.01); *A47B 57/00* (2013.01); *A47B 96/061* (2013.01); *A47F 5/0018* (2013.01); *H01R 13/24* (2013.01)

(58) Field of Classification Search
CPC ......... A47B 57/30; A47B 57/32; A47B 57/34; A47B 96/061; A47F 5/0018; F16M 11/00; F16M 11/04; F16M 11/041
See application file for complete search history.

(56) References Cited

FOREIGN PATENT DOCUMENTS

| | | |
|---|---|---|
| JP | 2006-280810 A | 10/2006 |
| JP | 2012-249721 A | 12/2012 |
| WO | WO 2016/051613 A1 | 4/2016 |

\* cited by examiner

FIG. 3
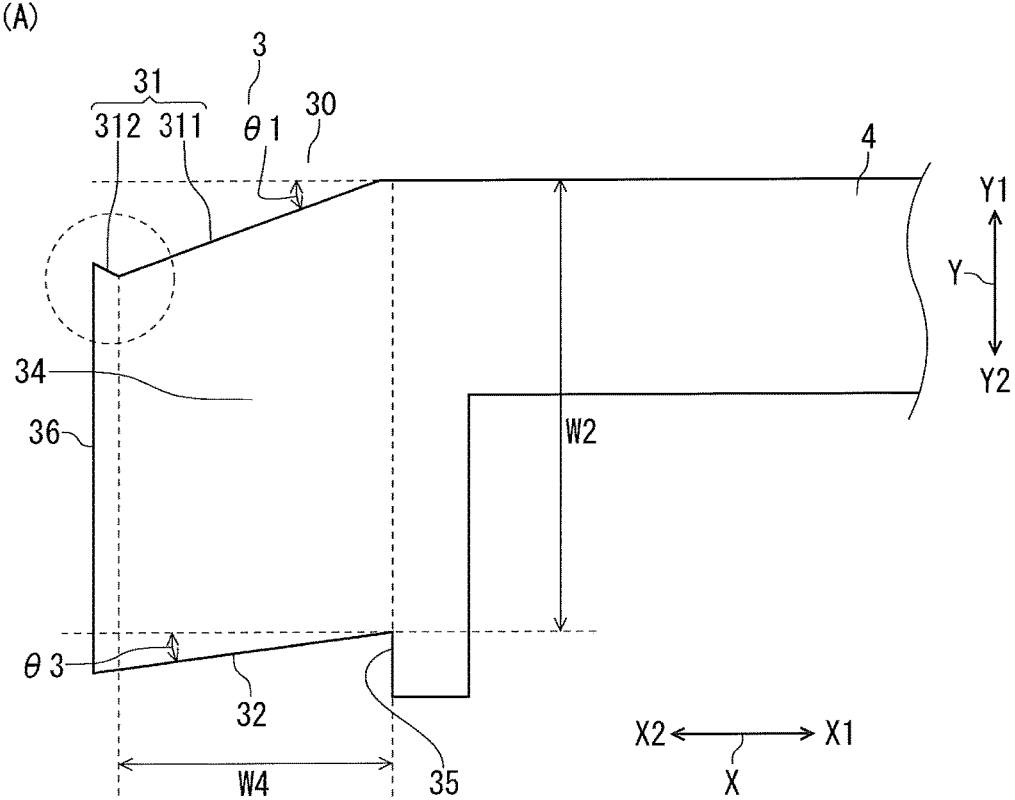
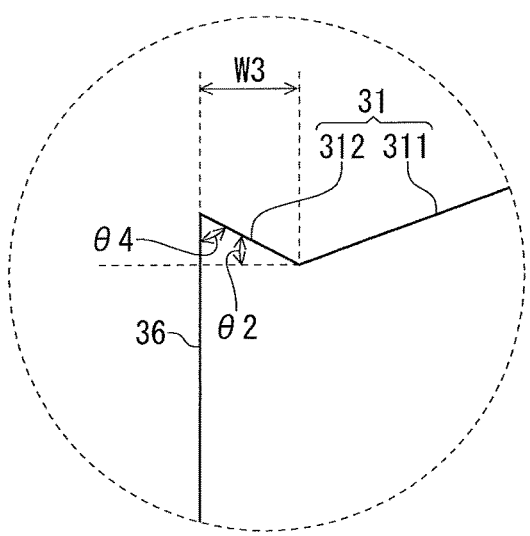

FIG. 6
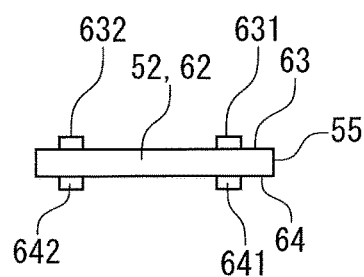
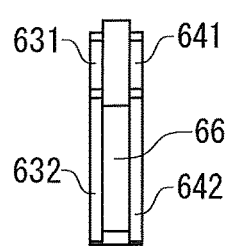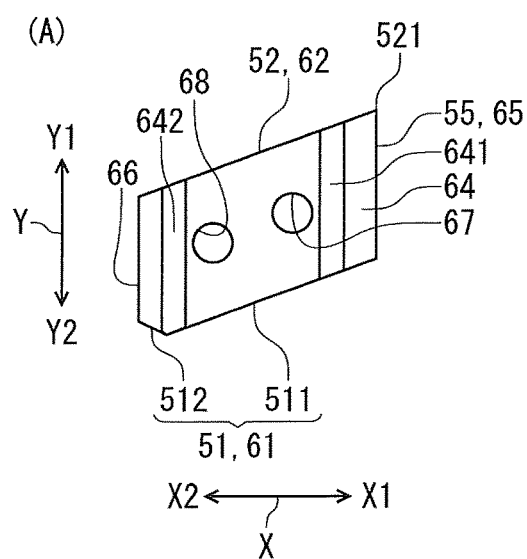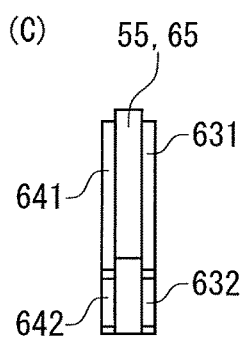
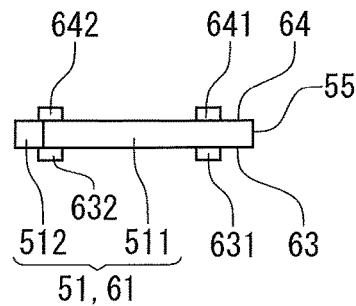

FIG. 7
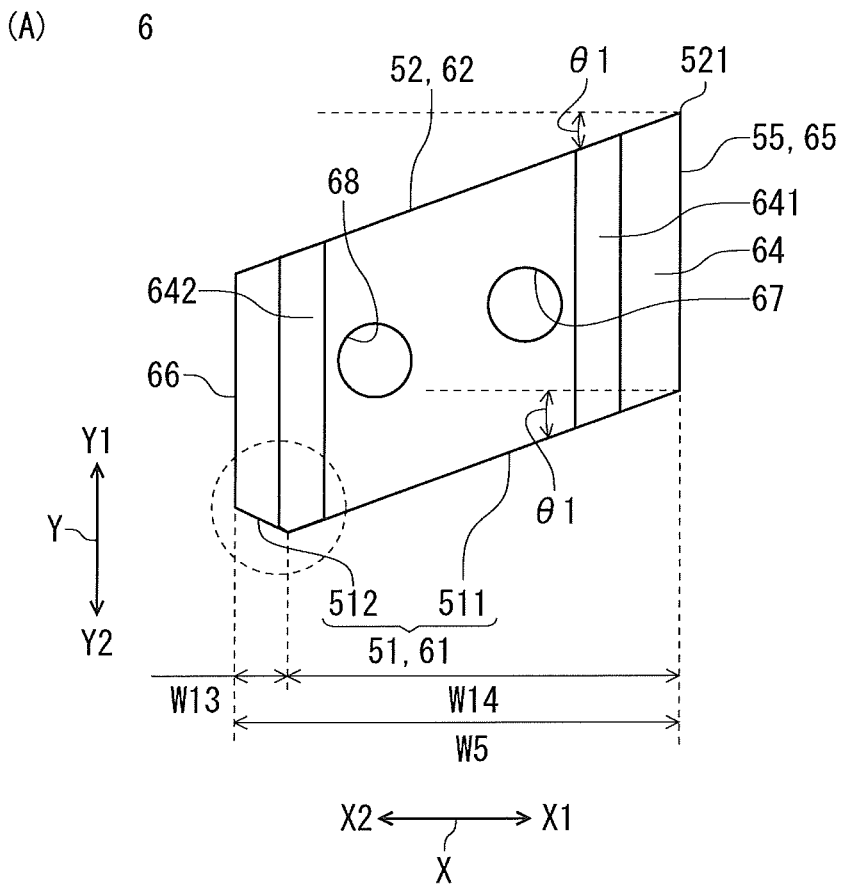
(A)
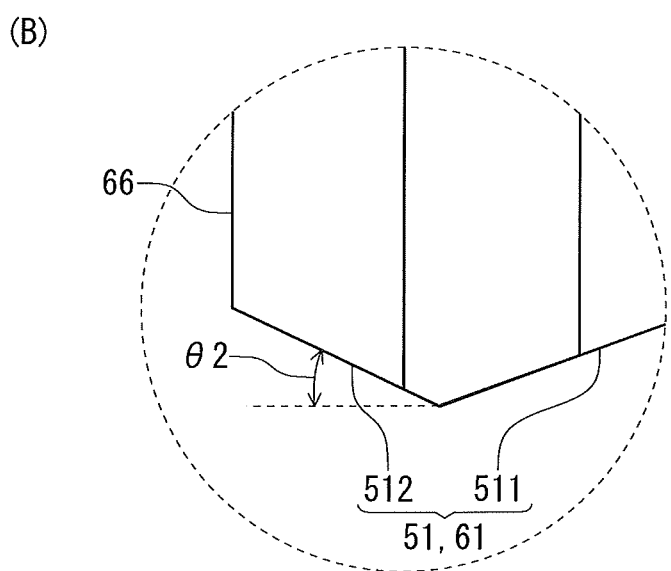
(B)

FIG. 13
(A) 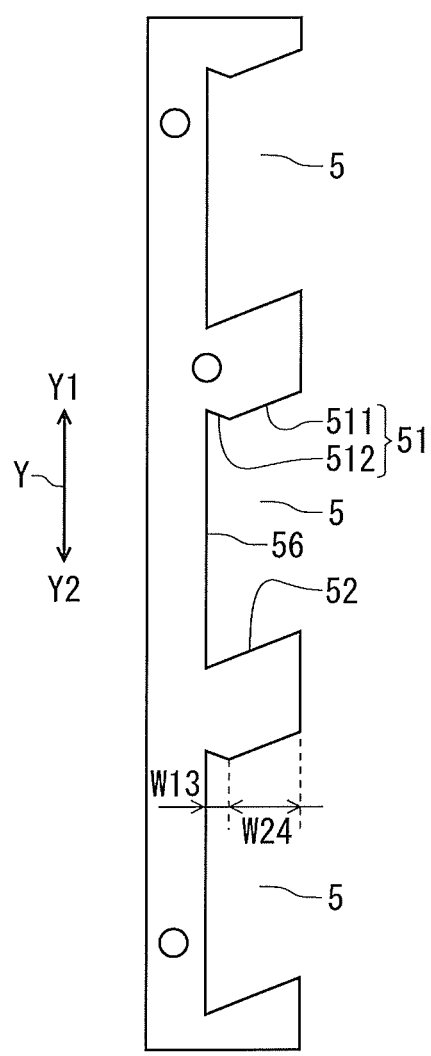
(B) 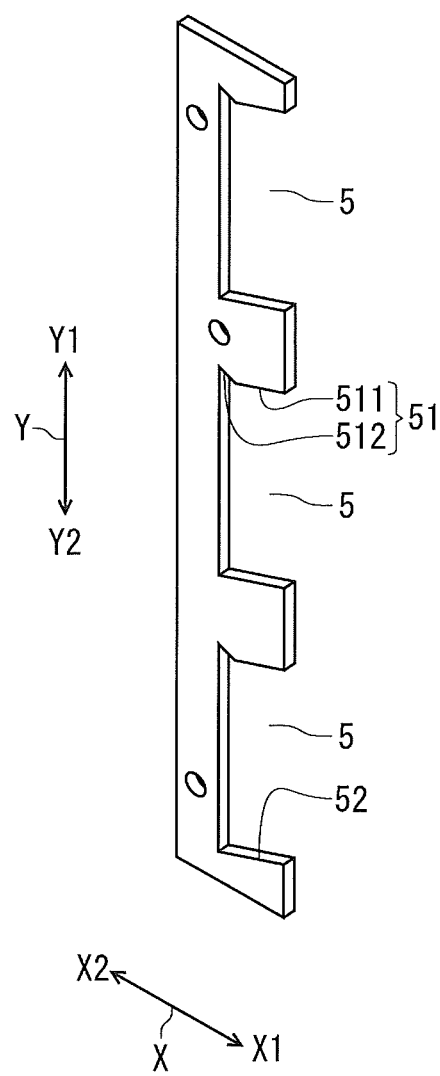

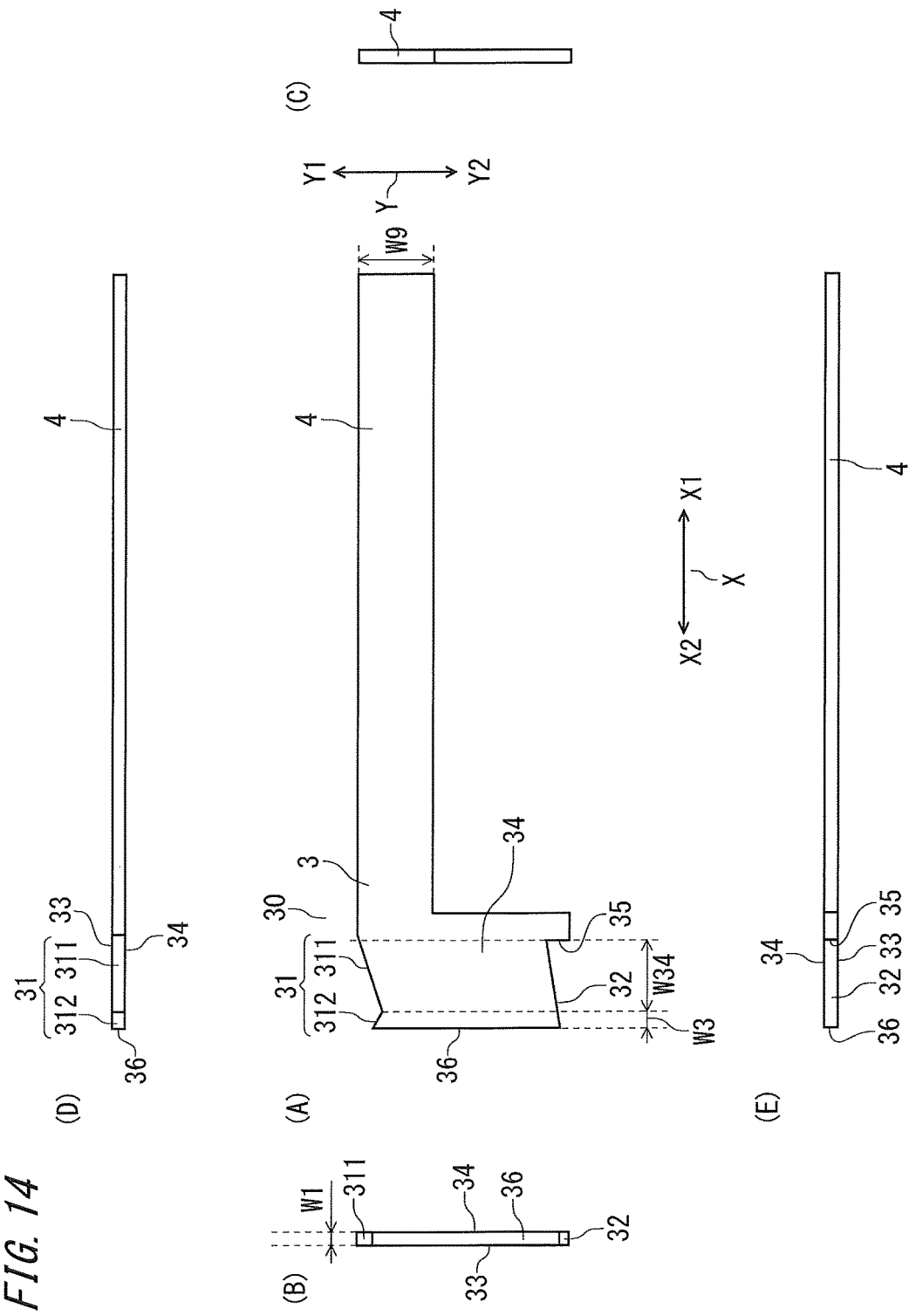

SHELVING BRACKET CAPABLE OF ELECTRICAL CONNECTIVITY

TECHNICAL FIELD

The present invention relates to a support apparatus that enables a support member to be stably fixed to a fixation member.

BACKGROUND ART

An example of conventional support apparatuses is a display rack bracket on which a rack board is placed and which has an engagement hook provided at a rear end and is supported in a cantilever manner by the engagement hook being inserted into one of multiple slits provided in the vertical direction in a support member. The display rack bracket is provided with: a resin anti-slipping member having a U-shaped cross section and mounted to the surface on which the rack board is placed; and a projection provided on the placement surface and preventing the anti-slipping member from dropping off the bracket. The projection has such a height that can be absorbed by an elastic force of the resin of the anti-slipping member.

CITATION LIST

Patent Document

Patent Document 1: Japanese Laid-Open Patent Publication No. 2008-136685

SUMMARY OF THE INVENTION

Problems to be Solved by the Invention

In the conventional support apparatus, when the engagement hook is inserted into the slit, there is a space between the upper surface side of the slit and the upper surface side of the engagement hook, thus causing a problem that the bracket is not stably fixed.

The present invention has been made to solve the above problem, and an object of the present invention is to provide a support apparatus that enables a support member to be stably fixed to a fixation member.

Solution to the Problems

A support apparatus of the present invention includes: a fixation member having opening portions; a support member detachably attached to the opening portion; and a receiving member fixed to the support member and supporting a load. In the opening portion of the fixation member, a first upper surface portion of the opening portion is formed of: a first front surface portion sloped in a downward direction from an opening side toward an opposite side; and a first rear surface portion formed continuously from the first front surface portion and sloped in an upward direction from the opening side toward the opposite side. A first lower surface portion of the opening portion is sloped in parallel with the first front surface portion. A first side surface portion and a second side surface portion of the opening portion are formed in planar shapes. The support member has an insertion portion to be inserted into the opening portion. In the insertion portion, a second upper surface portion of the insertion portion is formed of: a second front surface portion to contact with the first front surface portion; and a second rear surface portion to contact with the first rear surface portion. A second lower surface portion of the insertion portion is sloped in the downward direction from the opening side toward the opposite side such that the slope angle thereof with respect to a horizontal direction is smaller than the slope angle of the second front surface portion with respect to the horizontal direction, and the second lower surface portion is formed so as to contact with an opening-side end of the first lower surface portion. A third side surface portion and a fourth side surface portion of the insertion portion are formed so as to contact with the first side surface portion and the second side surface portion, respectively.

Effect of the Invention

The support apparatus of the present invention enables the support member to be stably supported with respect to the fixation member.

BRIEF DESCRIPTION OF THE DRAWINGS

FIG. 3 shows the details of the support member and the receiving member shown in FIG. 2.

FIG. 6 shows the structure of a chip portion of the fixation member shown in FIG. 5.

FIG. 7 shows the details of the chip portion shown in FIG. 6.

FIG. 13 shows the structure of a fixation member of a support apparatus in embodiment 2 of the present invention.

FIG. 14 shows the structure of a support member and a receiving member of the support apparatus in embodiment 2 of the present invention.

DESCRIPTION OF EMBODIMENTS

Embodiment 1

Figure 1:
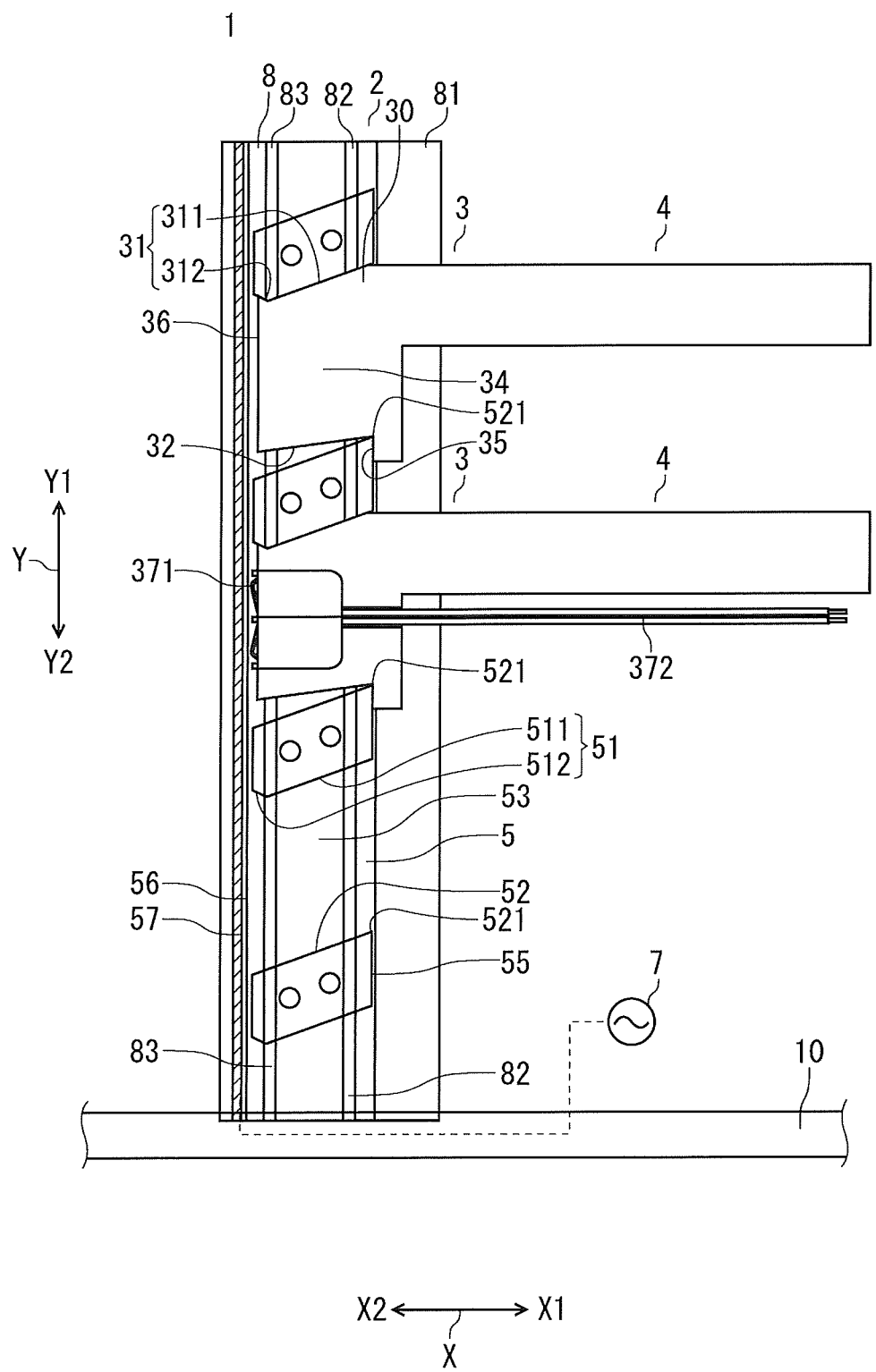
FIG. 1 shows the structure of a support apparatus in embodiment 1 of the present invention.
Figure 2:
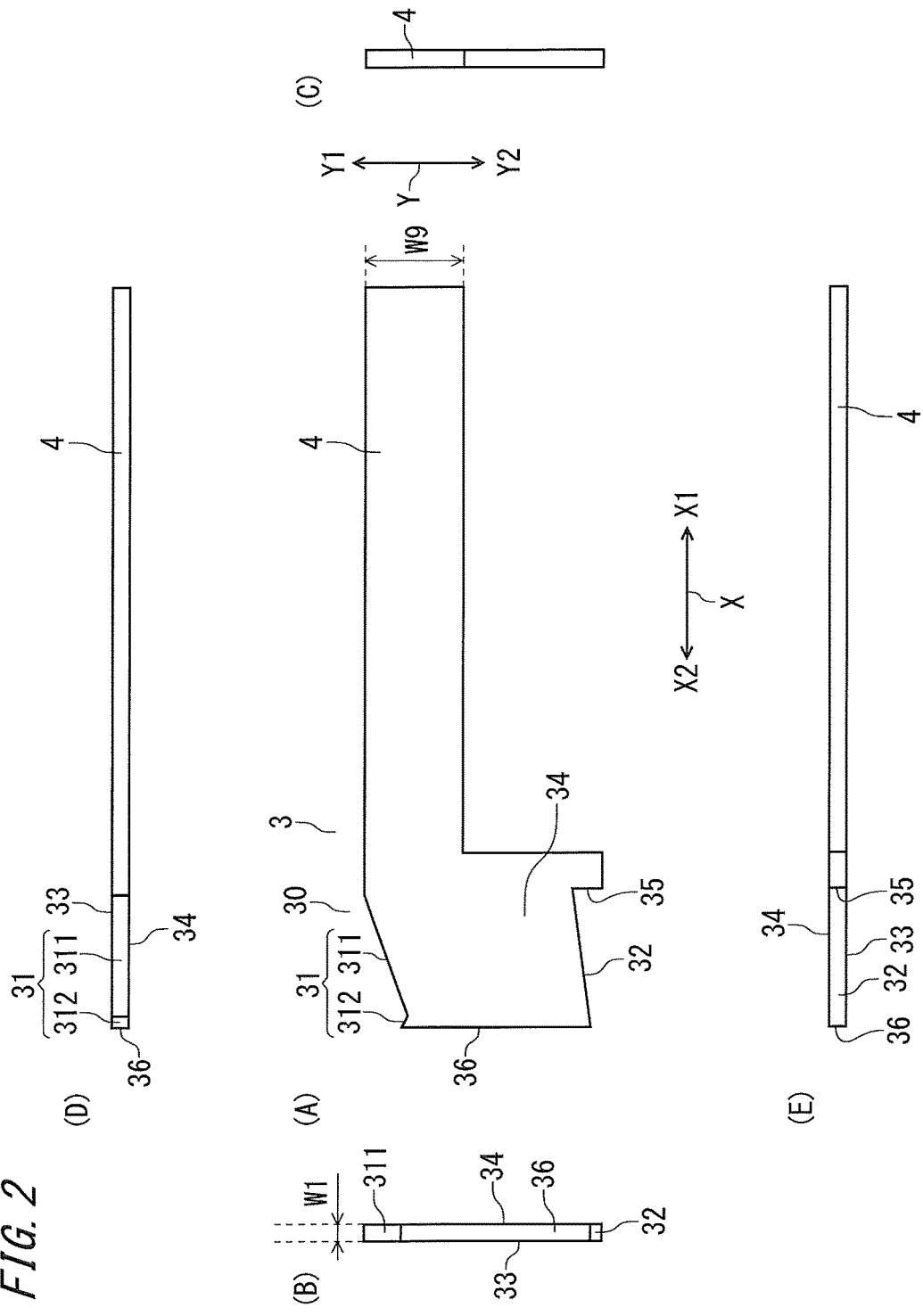
FIG. 2 shows the structure of a support member and a receiving member of the support apparatus shown in FIG. 1.

Hereinafter, embodiments of the invention of the present application will be described. FIG. 1 shows the structure of a support apparatus in embodiment 1 of the present invention. FIG. 1 shows a state in which one side plate portion 9 described later is removed. FIG. 2 shows the structure of a support member and a receiving member of the support apparatus shown in FIG. 1. FIG. 2(A) is a front view of the support member and the receiving member, FIG. 2(B) is a left side view of the support member and the receiving member, FIG. 2(C) is a right side view of the support member and the receiving member, FIG. 2(D) is a plan view of the support member and the receiving member, and FIG. 2(E) is a bottom view of the support member and the receiving member.

Figure 4:
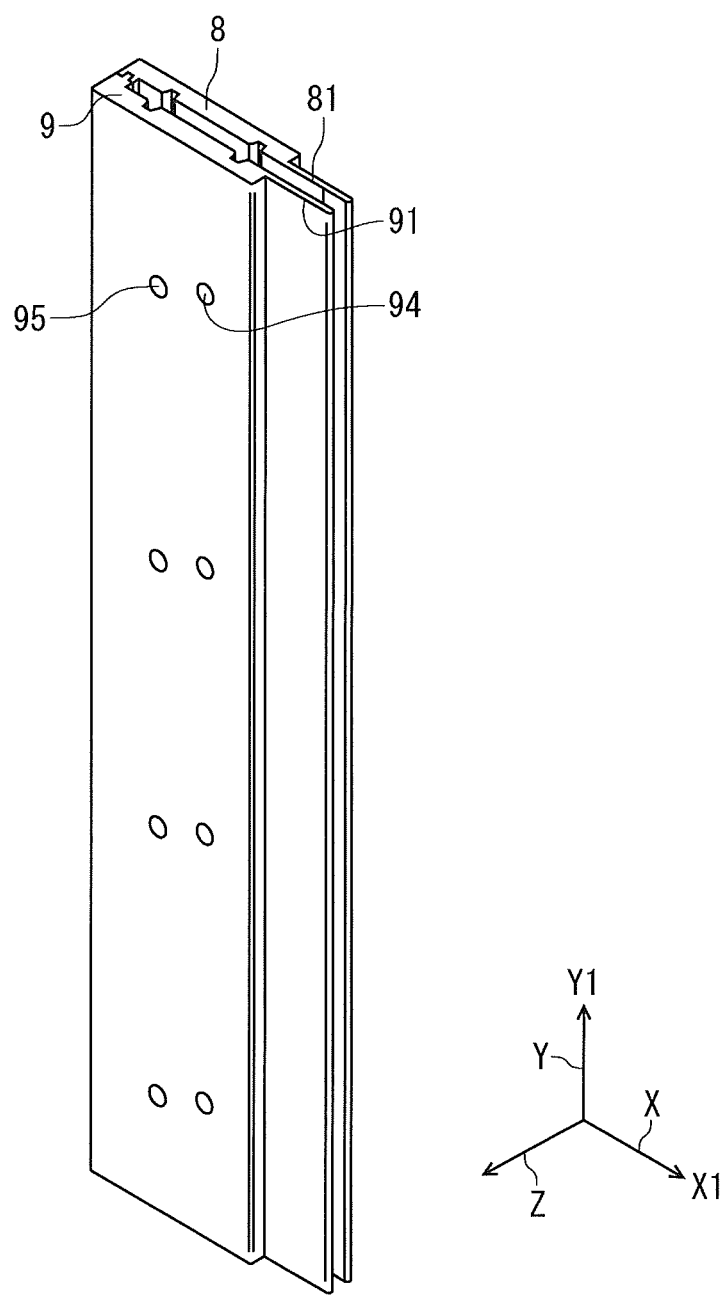
FIG. 4 is a perspective view showing the structure of a fixation member of the support apparatus shown in FIG. 1.
Figure 5:
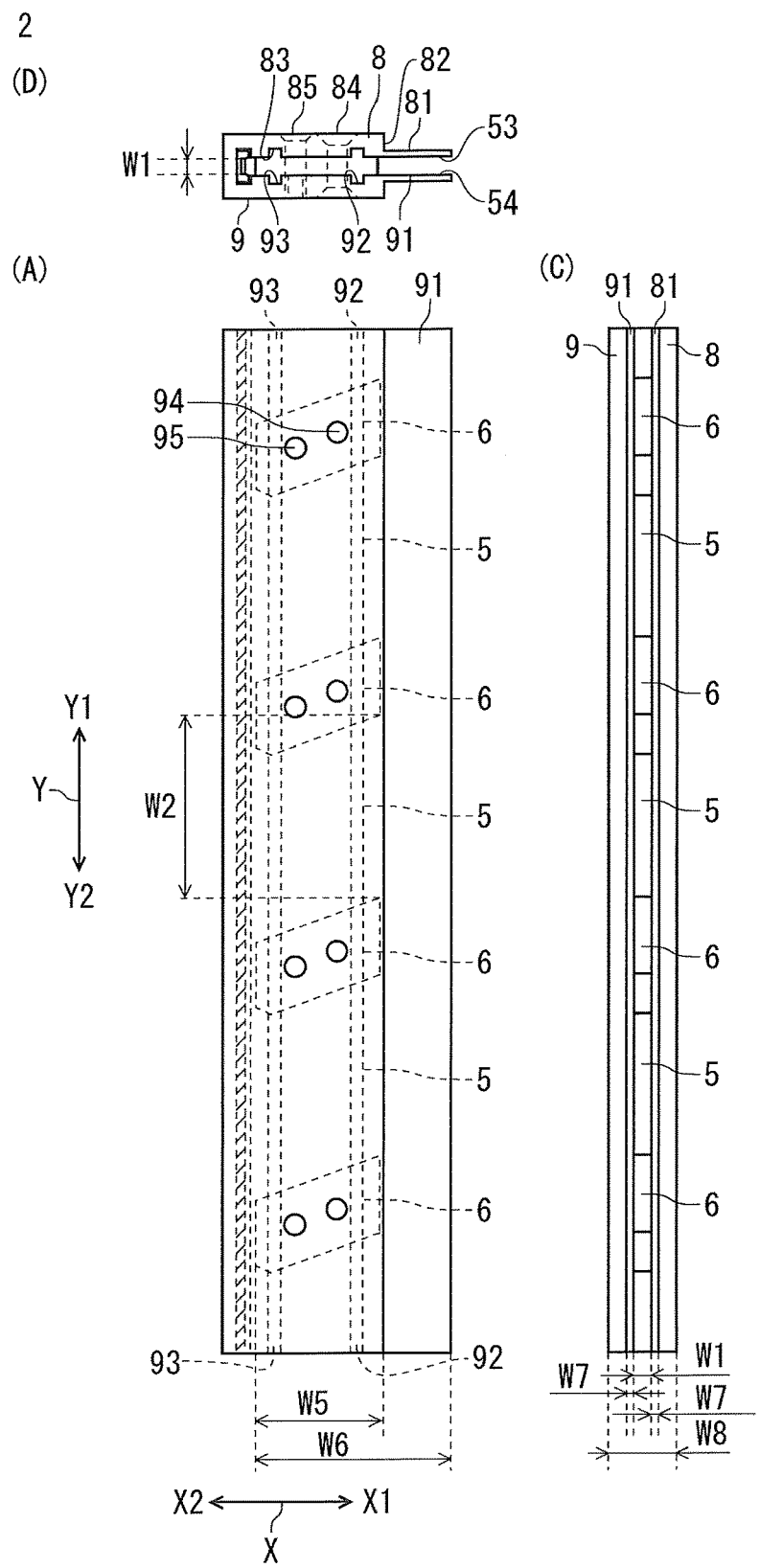
FIG. 5 shows the structure of the fixation member shown in FIG. 4.

FIG. 3 is a partial enlarged view showing the details of the support member and the receiving member shown in FIG. 2. FIG. 3(B) is a partial enlarged view obtained by further enlarging a part enclosed by a dotted line in FIG. 3(A). FIG. 4 is a perspective view showing the structure of a fixation member of the support apparatus shown in FIG. 1. FIG. 5 shows the structure of the fixation member shown in FIG. 4. FIG. 5(A) is a front view of the fixation member, FIG. 5(C) is a right side view of the fixation member, and FIG. 5(D) is a plan view of the fixation member.

Figure 8:
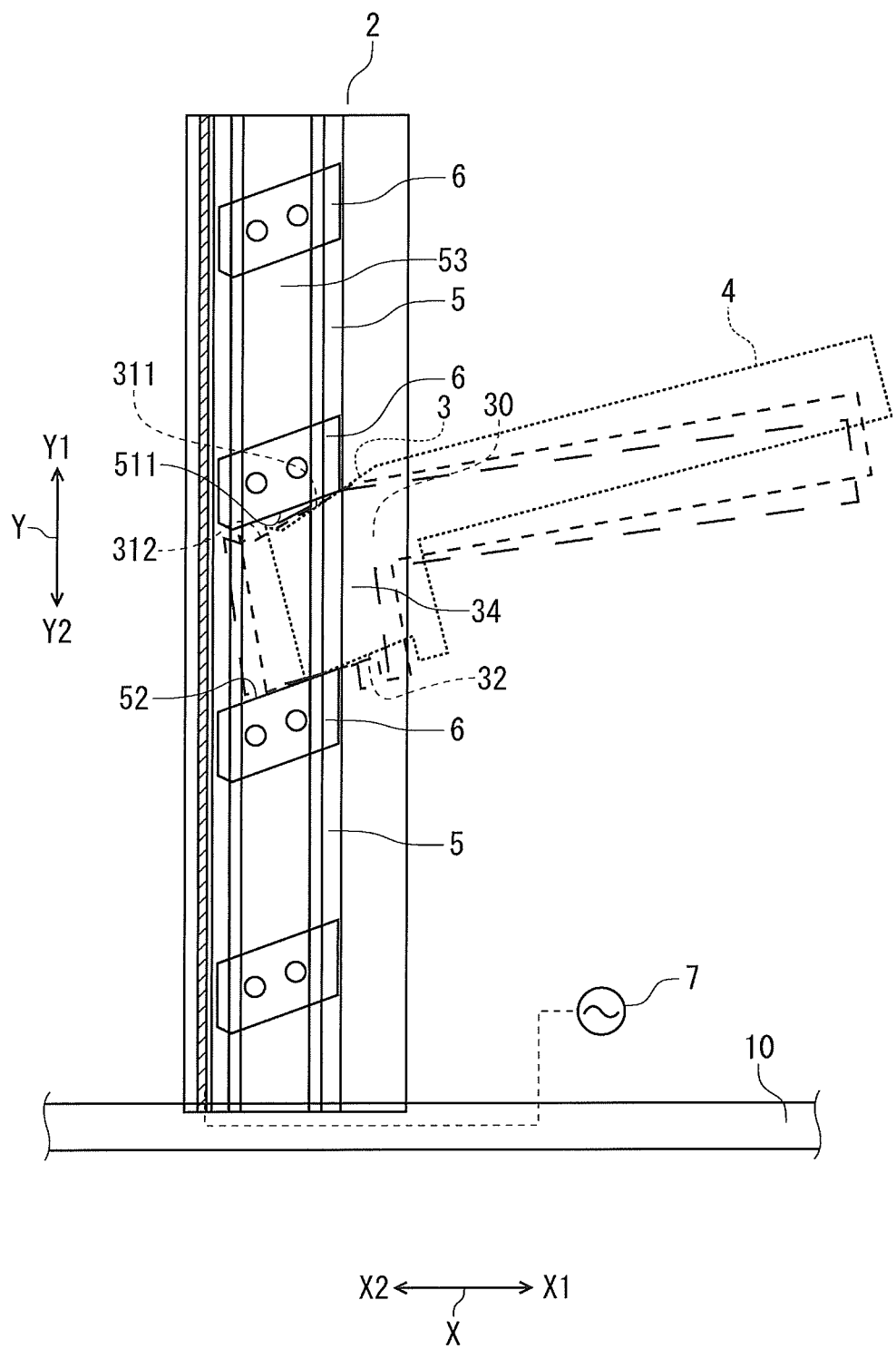
FIG. 8 shows a method for inserting the support member into the fixation member in the support apparatus shown in FIG. 1.

FIG. 6 shows the structure of a chip portion of the fixation member shown in FIG. 5. FIG. 6(A) is a front view of the chip portion, FIG. 6(B) is a left side view of the chip portion, FIG. 6(C) is a right side view of the chip portion, FIG. 6(D) is a plan view of the chip portion, and FIG. 6(E) is a bottom view of the chip portion. FIG. 7 is an enlarged view showing the details of the chip portion shown in FIG. 6. FIG. 7(B) is a partial enlarged view obtained by further enlarging a part enclosed by a dotted line in FIG. 7(A). FIG. 8 shows a method for inserting the support member into the fixation member in the support apparatus shown in FIG. 1.

Figure 9:
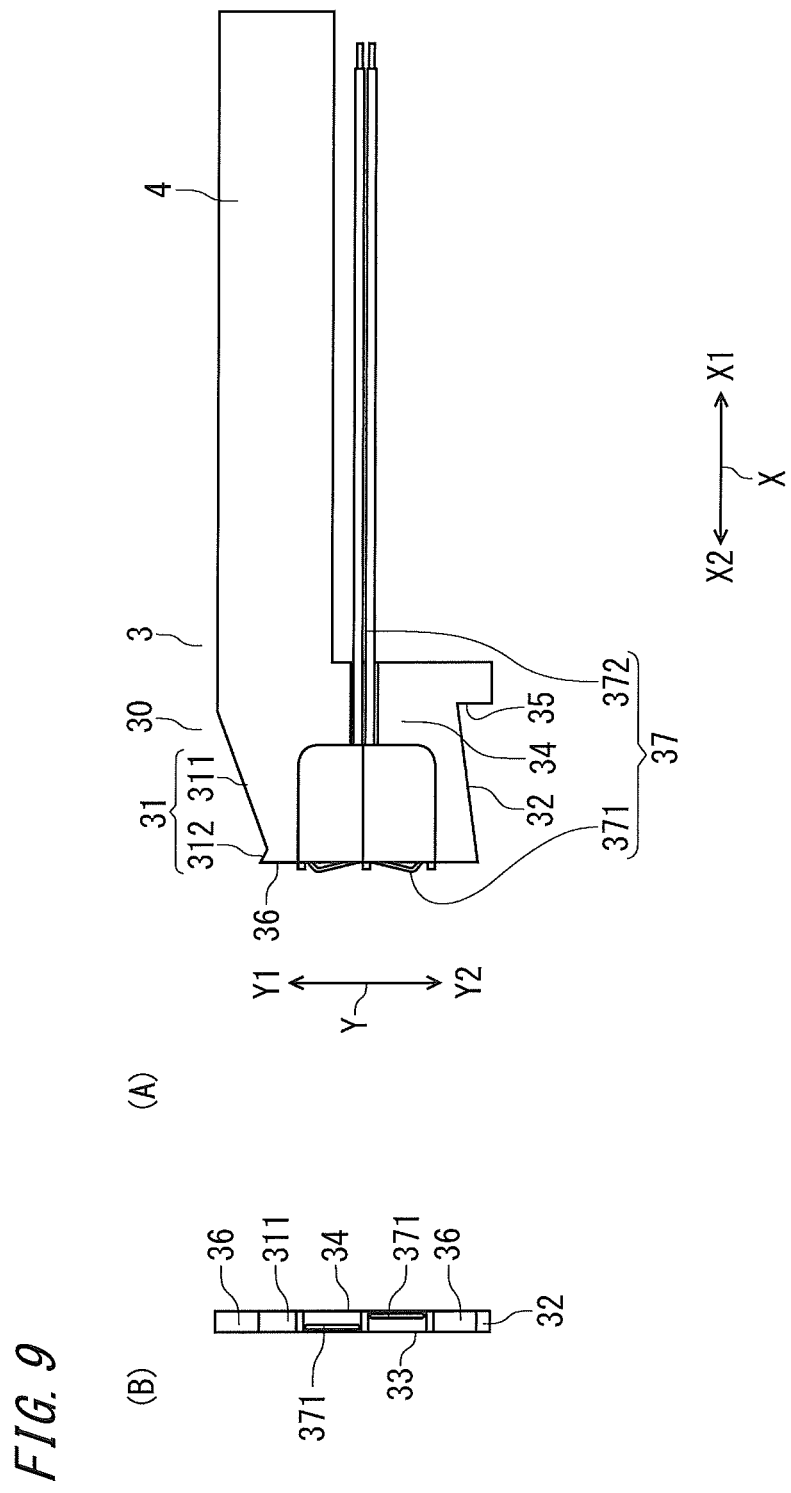
FIG. 9 shows another structure of the support member and the receiving member of the support apparatus shown in FIG. 1.
Figure 10:
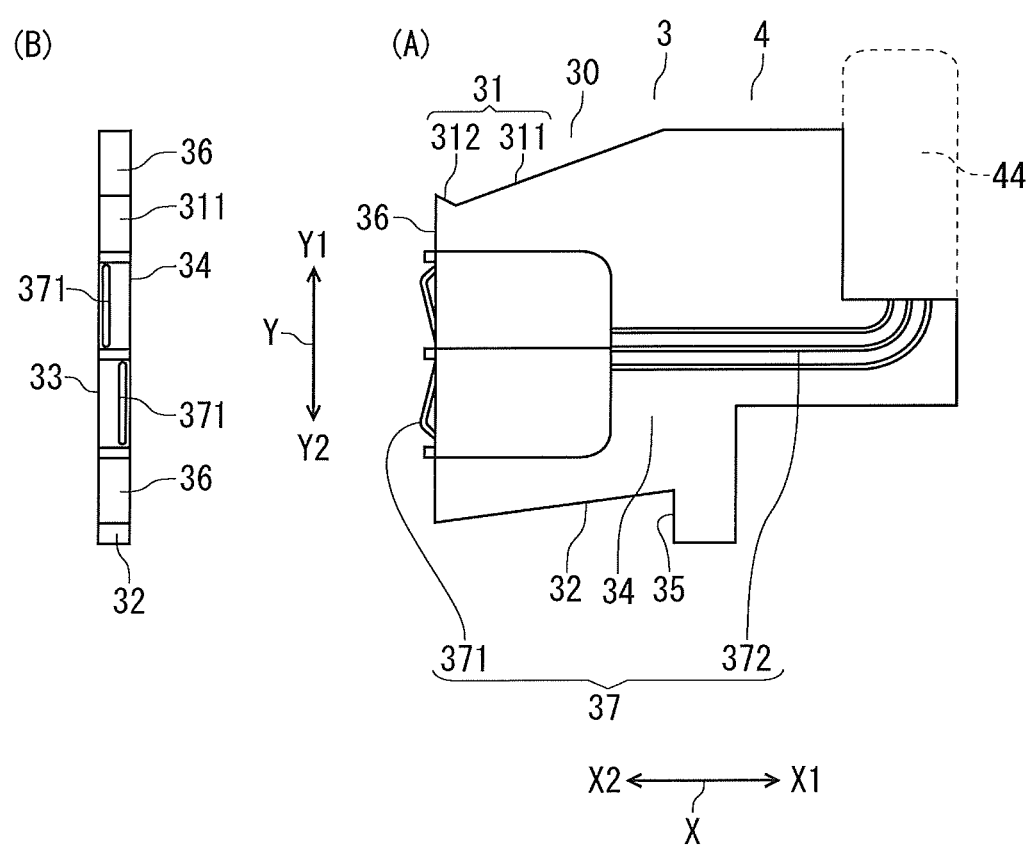
FIG. 10 shows another structure of the support member and the receiving member of the support apparatus in embodiment 1 of the present invention.
Figure 11:
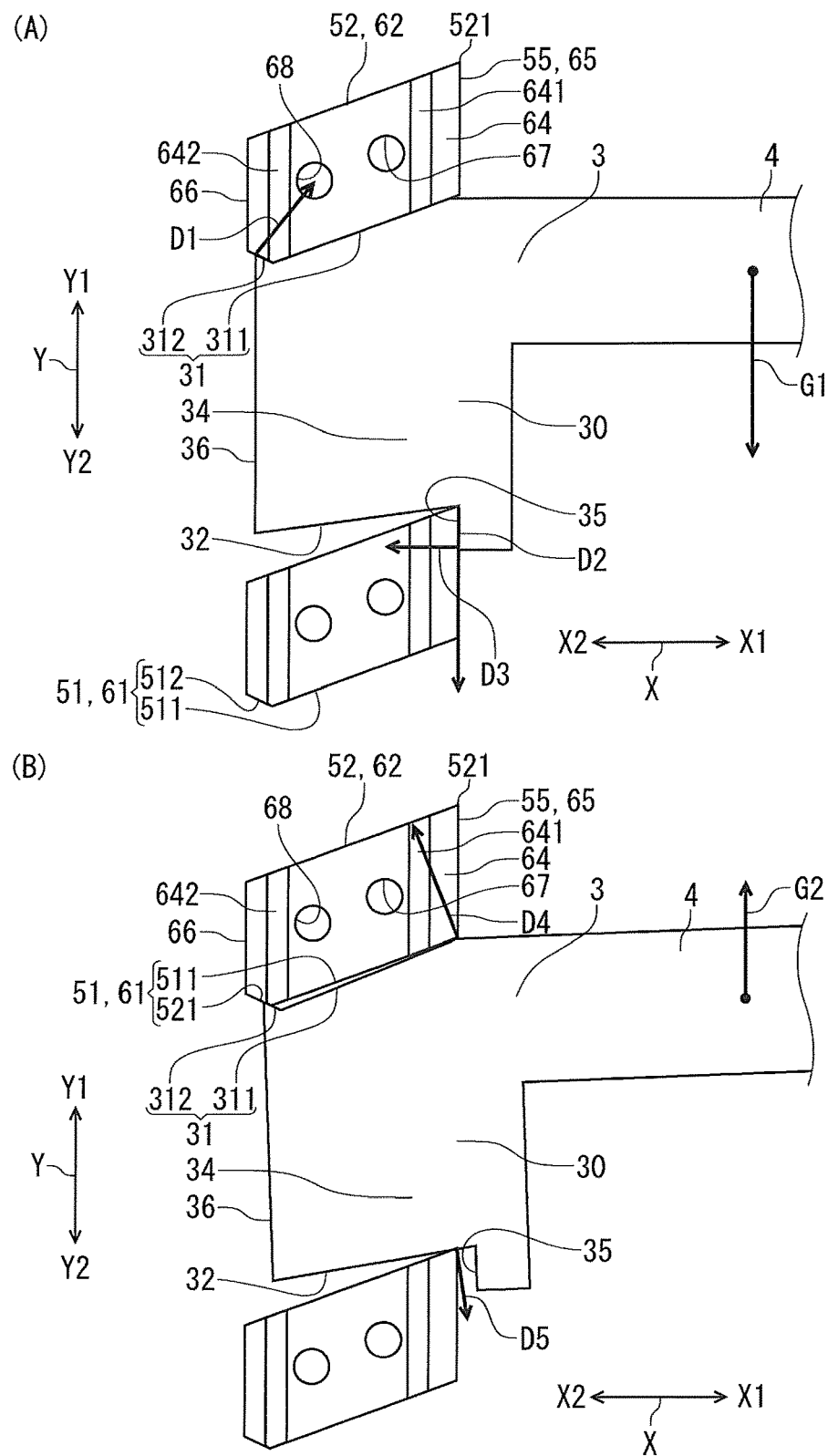
FIG. 11 illustrates the principle of the support apparatus shown in FIG. 1.
Figure 12:
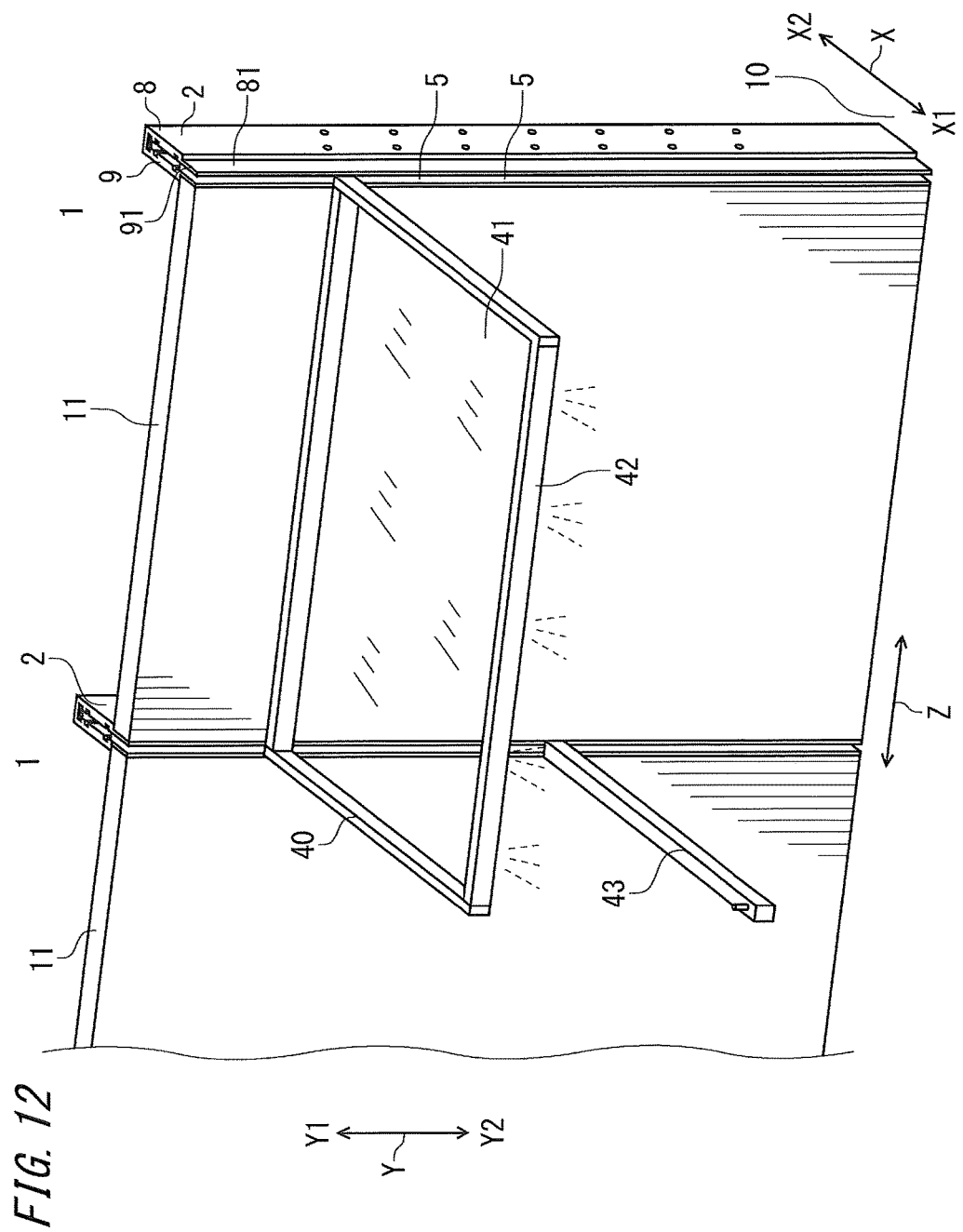
FIG. 12 shows an example of usage of the support apparatus shown in FIG. 1.

FIG. 9 shows another structure of the support member and the receiving member of the support apparatus shown in FIG. 1. FIG. 9(A) is a front view of the support member and the receiving member, and FIG. 9(B) is a left side view of the support member and the receiving member. FIG. 10 shows another structure of the support member and the receiving member of the support apparatus in embodiment 1 of the present invention. FIG. 10(A) is a front view of the support member and the receiving member, and FIG. 10(B) is a left side view of the support member and the receiving member. FIG. 11 shows the principle of the support apparatus shown in FIG. 1. FIG. 11(A) shows a principle in which a force is applied downward in the vertical direction to the receiving member of the support apparatus, and FIG. 11(B) shows a principle in which a force is applied upward in the vertical direction to the receiving member of the support apparatus. FIG. 12 is a perspective view showing an example of usage of the support apparatus shown in FIG. 1.

In the drawings, the support apparatus 1 is composed of: a fixation member 2 having opening portions 5 formed therein; a support member 3 detachably attached to each opening portion 5; and a receiving member 4 fixed to the support member 3 and supporting a load. The support apparatus 1 is installed standing on a floor 10 such that the long-side direction of the fixation member 2 coincides with a vertical direction Y. It is noted that the vertical direction Y, a horizontal direction X, and a short-side direction Z as shown with the fixation member 2 in FIG. 4 are used in the following description.

The vertical direction Y is the long-side direction, and can also indicate the height direction Y. The support member 3 is attachable to and detachable from each opening portion 5 of the fixation member 2. The purpose of the support apparatus 1 is to support a load, e.g., a rack board, a hanger hooking fixture, or an electric device, by a receiving member 4 contiguous to the support member 3 attached to the fixation member 2.

The opening portion 5 of the fixation member 2 will be described. The opening portion 5 is formed of a first upper surface portion 51, a first lower surface portion 52, a first side surface portion 53, a second side surface portion 54, and a first bottom surface portion 56. The first upper surface portion 51 is formed of a first front surface portion 511 and a first rear surface portion 512. The first front surface portion 511 is sloped in a downward direction Y2 from an opening side X1 toward an opposite side X2 of the opening portion 5. A slope angle θ1 (see FIG. 7(A)) of the first front surface portion 511 with respect to the horizontal direction X is set to, for example, 20 degrees.

The first rear surface portion 512 is formed continuously from the first front surface portion 511. The first rear surface portion 512 is sloped in an upward direction Y1 from the opening side X1 toward the opposite side X2 of the opening portion 5. A slope angle θ2 (see FIG. 7(B)) of the first rear surface portion 512 with respect to the horizontal direction X is set to, for example, 30 degrees. The first lower surface portion 52 of the opening portion 5 is sloped in parallel with the first front surface portion 511. Therefore, the slope angle θ1 of the first lower surface portion 52 with respect to the horizontal direction X is set to, for example, 20 degrees.

A length W14 of the first front surface portion 511 in the horizontal direction X toward the opening side X1 is set to be equal to or greater than four times a length W13 of the first rear surface portion 512 in the horizontal direction X toward the opening side X1. Here, the length W14 is set to be about six times the length W13. A length W2 of the opening portion 5 in the long-side direction, i.e., the vertical direction Y, is set to be about ten times a length W1 in the short-side direction Z. The first side surface portion 53 and the second side surface portion 54 (see FIG. 5(D)) of the opening portion 5 are formed in planar shapes in parallel to the vertical direction Y.

A length W6 of the first side surface portion 53 and the second side surface portion 54 of the opening portion 5 in the horizontal direction X toward the opening side X1 is set to be longer than a length W5 of the first upper surface portion 51 and the first lower surface portion 52 of the opening portion 5 in the horizontal direction X toward the opening side X1. Outside the opening portion 5, a first vertical surface portion 55 is formed extending in the downward direction Y2 continuously from the first lower surface portion 52 of the opening portion 5. The fixation member 2 has a wiring portion 57 for transmitting power from an external power supply 7, at the first bottom surface portion 56 on the side X2 opposite to the opening side X1 of the opening portion 5.

The support member 3 has an insertion portion 30 to be inserted into the opening portion 5. The insertion portion 30 is formed of a second upper surface portion 31, a second lower surface portion 32, a third side surface portion 33, a fourth side surface portion 34, and a second bottom surface portion 36. The second upper surface portion 31 is formed of a second front surface portion 311 and a second rear surface portion 312. The second front surface portion 311 is formed so as to contact with the first front surface portion 511, and therefore is sloped in the downward direction Y2 from the opening side X1 toward the opposite side X2 of the opening portion 5. Therefore, the slope angle θ1 of the second front surface portion 311 with respect to the horizontal direction X is set to 20 degrees, which is the same as that of the first front surface portion 511 of the opening portion 5. A slope angle θ4 of the second rear surface portion 312 with respect to the vertical direction Y is set to 60 degrees.

The second rear surface portion 312 is formed so as to contact with the first rear surface portion 512, and therefore is sloped in the upward direction Y1 from the opening side X1 toward the opposite side X2 of the opening portion 5.

Therefore, the slope angle θ2 of the second rear surface portion 312 with respect to the horizontal direction X is set to 30 degrees, which is the same as that of the first front surface portion 511 of the opening portion 5. The second lower surface portion 32 is sloped in the downward direction Y2 from the opening side X1 toward the opposite side X2, at a slope angle θ3 with respect to the horizontal direction X, which is smaller than the slope angle θ1 of the second front surface portion 311 with respect to the horizontal direction X. The second lower surface portion 32 is to contact with an opening-side end 521 of the second front surface portion 311.

The slope angle θ3 of the second lower surface portion 32 with respect to the horizontal direction X is set to, for example, 8 degrees. A length W4 of the second front surface portion 311 in the horizontal direction X toward the opening side X1 is set to be equal to or greater than four times the length W3 of the second rear surface portion 312 in the horizontal direction X toward the opening side X1. Here, similarly to the opening portion 5, the length W4 is set to be about six times the length W3. The third side surface portion 33 and the fourth side surface portion 34 are formed so as to contact with the first side surface portion 53 and the second side surface portion 54, respectively, and therefore are formed in planar shapes in parallel to the vertical direction Y.

The support member 3 has a second vertical surface portion 35 which is formed continuously from the second lower surface portion 32 of the insertion portion 30 and which is to contact with the first vertical surface portion 55. A length W9 of the receiving member 4 in the vertical direction Y is formed to be smaller than the length W2 of the opening portion 5 in the vertical direction. In the case where power is led to the outside via the support member 3, the support member 3 is configured as shown in FIG. 9. In this case, at the second bottom surface portion 36 of the insertion portion 30, a power supply portion 37 is provided which is to contact with the wiring portion 57 to lead power to the outside from the opening side X1 of the opening portion 5 of the fixation member 2.

The power supply portion 37 includes: a spring electrode portion 371 which is to contact with the wiring portion 57; and a lead wire portion 372 connected to the spring electrode portion 371. The lead wire portion 372 is for supplying power to an electric device such as a lighting device provided to the receiving member 4. As another example, as shown in FIG. 10, the receiving member 4 may be shortened in the length in the horizontal direction X so as to be used only for taking out the power and the power supply portion 37 may be connected to an electric device 44 mounted to the receiving member 4.

Next, a specific configuration of the fixation member 2 will be described. The fixation member 2 is composed of a plurality of chip portions 6 having the same shape, and side plate portions 8, 9. As shown in FIG. 6 and FIG. 7, the chip portion 6 has an upper surface 62, a lower surface 61, side surfaces 63, 64, a front surface 65, and a rear surface 66. The lower surface 61 forms the first upper surface portion 51 of the opening portion 5. The upper surface 62 forms the first lower surface portion 52 of the opening portion 5. The front surface 65 forms the first vertical surface portion 55 of the fixation member 2.

Protrusions 631, 632 as second recess/protrusion portions which protrude outward in the short-side direction Z are formed on the side surface 63. Protrusions 641, 642 as second recess/protrusion portions which protrude outward in the short-side direction Z are formed on the side surface 64.

Screw holes 67, 68 penetrating in the short-side direction Z are formed at the center in the side surfaces 63, 64. Screw holes 84, 85, 94, 95 for screwing the chip portion 6 via the screw holes 67, 68 are formed in the side plate portions 8, 9. The side plate portions 8, 9 form the first side surface portion 53, the second side surface portion 54, and the first bottom surface portion 56 of the opening portion 5.

By protruding portions 81, 91 protruding toward the opening side X1 from the respective side plate portions 8, 9, the length W6 of the first side surface portion 53 and the second side surface portion 54 in the horizontal direction X is made greater than the length W5 of the first upper surface portion 51 and the first lower surface portion 52 of the opening portion 5 in the horizontal direction X. In the surface parts of the side plate portions 8, 9 which form the first side surface portion 53 and the second side surface portion 54, recesses 82, 83, 92, 93 as first recess/protrusion portions to which the protrusions 631, 632, 641, 642 of the chip portion 6 are to be fitted are formed continuously in the vertical direction Y. It is noted that the same structure can be realized even in the case where the protrusions 631, 632, 641, 642 of the chip portion 6 are replaced with recesses and the recesses 82, 83, 92, 93 of the side plate portions 8, 9 are replaced with protrusions.

The protrusions 631, 632, 641, 642 of the chip portion 6 are fitted to predetermined locations in the recesses 82, 83, 92, 93 of the side plate portions 8, 9. Then, with the chip portion 6 held between the side plate portions 8, 9, the chip portion 6 is screwed via the screw holes 67, 68, 84, 85, 94, 95, thereby forming the fixation member 2. Without limitation to screwing, the chip portion 6 may be fixed by welding, for example. In addition, the side plate portions 8, 9 form the first bottom surface portion 56 on the side X2 opposite to the opening side X1, and the wiring portion 57 is arranged there.

Here, a specific example of the size of the support apparatus 1 will be described. Parts of the support apparatus 1 are made of metal materials, and may be made of a stainless material, for example. In the fixation member 2 of the support apparatus 1, the length W1 of the opening portion 5 in the short-side direction Z is set to 3 mm, the length W2 thereof in the vertical direction Y is set to 35 mm, and the length W5 thereof in the horizontal direction X is set to 24 mm. The length W13 of the first rear surface portion 512 of the opening portion 5 in the horizontal direction X is set to 3.5 mm, and the length W14 of the first front surface portion 511 in the horizontal direction X is set to 20.5 mm.

A length W7 of each protruding portion 81, 91 of the fixation member 2 in the short-side direction Z is set to 1 mm, and a length W8 across the side plate portions 8, 9 in the short-side direction Z is set to 12 mm. In the insertion portion 30 of the support member 3, the length W3 of the second rear surface portion 312 in the horizontal direction X is set to 3.5 mm and the length W4 of the second front surface portion 311 in the horizontal direction X is set to 20.5 mm.

The length W1 of the support member 3 and the receiving member 4 in the short-side direction Z is the same as the length W1 of the opening portion 5 of the fixation member 2 in the short-side direction Z shown above, and they are formed by members having the same thickness. Further, the opening portion 5 of the fixation member 2 is formed by the chip portions 6 being fixed between the side plate portion 8 and the side plate portion 9 by means of screwing, welding, or the like. Therefore, owing to the thickness due to the fixation, even if the length W1 of the fixation member 2 and the length W1 of the support member 3 and the receiving member 4 are equal to each other, there is a slight thickness difference depending on the fixation method and the side plate portion 8 and the side plate portion 9 exhibit a spring effect, whereby the insertion portion 30 of the support member 3 can be inserted into the opening portion 5 of the fixation member 2.

Next, a process and the principle of the support apparatus 1 when the insertion portion 30 of the support member 3 is attached to and detached from the opening portion 5 of the fixation member 2 of the support apparatus 1 in embodiment 1 configured as described above, will be described. As shown in FIG. 8, with the end side of the receiving member 4 tilted in the upward direction Y1 of the height direction Y, the insertion portion 30 of the support member 3 is inserted into the opening portion 5. Here, the insertion is performed such that the second front surface portion 311 of the second upper surface portion 31 of the insertion portion 30 progresses along the first front surface portion 511 of the first upper surface portion 51 of the opening portion 5, and the second lower surface portion 32 of the insertion portion 30 progresses along the first lower surface portion 52 of the opening portion 5.

At this time, since the second rear surface portion 312 of the second upper surface portion 31 of the insertion portion 30 is sloped in the upward direction Y1 of the vertical direction Y unlike the second front surface portion 311, the insertion cannot be performed because the second rear surface portion 312 of the insertion portion 30 comes into contact with the first front surface portion 511 of the opening portion 5, as long as the second lower surface portion 32 of the insertion portion 30 is formed so as to contact with the first lower surface portion 52 of the opening portion 5 at the same slope angle. However, since the slope angle 92 of the second lower surface portion 32 of the insertion portion 30 is smaller than the slope angle θ1 of the first lower surface portion 52 of the opening portion 5, the insertion is not hampered by the second rear surface portion 312 of the insertion portion 30, and the insertion portion 30 can be inserted into the opening portion 5.

Then, as shown in FIG. 1, the insertion portion 30 is attached to the opening portion 5. Further, at this time, the first side surface portion 53 and the second side surface portion 54 of the opening portion 5 serve as guides for insertion of the third side surface portion 33 and the fourth side surface portion 34 of the insertion portion 30, and also serve as guides for supporting them.

Then, as shown in FIG. 11(A), in a state in which the insertion of the support member 3 into the opening portion 5 of the fixation member 2 is finished, a load G1 applied to the receiving member 4 is supported by the fixation member 2. It is noted that the load G includes also the weight of the receiving member 4 itself. The force of the load G1 is applied to the receiving member 4 in the arrow direction, i.e., the downward direction Y2 of the vertical direction Y. In general, this state corresponds to a state in which the receiving member 4 of the support apparatus 1 is being used. In this state, the second rear surface portion 312 of the insertion portion 30 contacts with the first rear surface portion 512 of the opening portion 5, whereby a contact force D1 is applied in the arrow direction. Further, the second lower surface portion 32 of the insertion portion 30 contacts with the opening-side end 521 of the first lower surface portion 52 of the opening portion 5, whereby a contact force D2 is applied in the arrow direction.

Further, the second vertical surface portion 35 of the support member 3 contacts with the first vertical surface portion 55 of the fixation member 2, whereby a contact force D3 is applied in the arrow direction. Thus, at least the three contact forces D1, D2, D3 described above act on the fixation member 2 so that the load G1 of the receiving member 4 is transferred in a dispersed manner to the fixation member 2, whereby stable retention is achieved without rattling. In addition, as a matter of course, the first side surface portion 53 and the second side surface portion 54 of the opening portion 5 restrain the third side surface portion 33 and the fourth side surface portion 34 of the insertion portion 30, thus serving as guides for supporting them.

The case where a force of a load G2 is applied to the receiving member 4 in the arrow direction, i.e., the upward direction Y1 of the vertical direction Y as shown in FIG. 11(B) will be described. In general, this case indicates a state in which a force in the upward direction Y1 of the vertical direction Y is temporarily applied by erroneous collision with the receiving member 4 when the receiving member 4 of the support apparatus 1 is being used (in the state in FIG. 11(A)). In this state, the second upper surface portion 31 of the insertion portion 30 contacts with the first upper surface portion 51 of the opening portion 5, whereby a contact force D4 is applied in the arrow direction.

Further, the second lower surface portion 32 of the insertion portion 30 contacts with the first lower surface portion 52 of the opening portion 5, whereby a contact force D5 is applied in the arrow direction. Thus, the contact forces D4, D5 act at two points as described above so that the load G2 of the receiving member 4 is transferred in a dispersed manner to the fixation member 2, whereby the insertion portion 30 of the support member 3 is prevented from coming off the opening portion 5 of the fixation member 2. Also in this case, as a matter of course, the first side surface portion 53 and the second side surface portion 54 of the opening portion 5 restrain the third side surface portion 33 and the fourth side surface portion 34 of the insertion portion 30, thus serving as guides for supporting them.

In the case of extracting the insertion portion 30 of the support member 3 from the opening portion 5, by a procedure reverse to the above attachment procedure, the end side of the receiving member 4 is tilted in the upward direction Y1 of the vertical direction Y, and the support member 3 and the receiving member 4 are extracted. As described above, even if the load G2 is applied to the receiving member 4 in the upward direction Y1 of the vertical direction Y, the insertion portion 30 is not detached from the opening portion 5, but if the receiving member 4 is tilted at a limited angle in the upward direction Y1 of the vertical direction Y, i.e., at a limited angle at the time of insertion as shown in FIG. 8, the insertion portion 30 can be easily detached from the opening portion 5.

Next, an example of construction of the support apparatus in embodiment 1 configured as described above will be described with reference to FIG. 12. First, a pair of the fixation members 2 are placed vertically on the floor 10. At this time, the fixation members 2 are placed such that the protruding portion 81 of the side plate portion 8 and the protruding portion 91 of the side plate portion 9 protrude by an amount corresponding to the thickness of wall surface portions 11. Then, each wall surface portion 11 is placed along the protruding portion 81 and the protruding portion 91.

At this time, the respective opening portions 5 of the pair of fixation members 2 are arranged at the same positions in the height direction Y. Then, a pair of the support members 3 are attached to a pair of the opening portions 5 formed at the same position in the height direction Y in the pair of fixation members 2. Then, the pair of receiving members 4 of the pair of support members 3 can support a load placed across the pair of receiving members 4, e.g., a frame 40 provided with a glass plate 41. LEDs may be provided to a front surface portion 42 of the frame 40, and thus the frame 40 can be used as a light-equipped frame. In addition, a hanger receiving member 43 can be supported as a load by one receiving member 4. It is noted that the load on the receiving member 4 is not limited to the above loads and various articles can be supported as long as the support member 3 can withstand the load of the article.

The construction of the support apparatus 1 is not limited to the above example. Even in another construction example, the support members 3 and the receiving members 4 can be used in the same manner as long as the fixation member 2 can be placed with its height direction Y set vertically. Only one fixation member 2 may be provided. One fixation member 2 having a plurality of the opening portions 5 in the height direction Y may be provided and the support members 3 and the receiving members 4 may be provided to the plurality of opening portions 5 arranged in the height direction Y. A usage example in which one set of the support member 3 and the receiving member 4 is inserted into the fixation member 2 having only one opening portion 5 is also possible in the same manner.

The receiving member 4 is not limited to the above structure, but may be formed in various shapes such as a cylindrical shape and a square prism shape as long as the receiving member 4 can be adapted to the support member 3.

In the support apparatus in embodiment 1 configured as described above, when the insertion portion of the support member is inserted into the opening portion of the fixation member, the second front surface portion of the insertion portion contacts with the first front surface portion of the opening portion, the second rear surface portion of the insertion portion contacts with the first rear surface portion of the opening portion, the second lower surface portion of the insertion portion contacts with the opening-side end of the first lower surface portion of the opening portion, and the third side surface portion and the fourth side surface portion of the insertion portion contact with the first side surface portion and the second side surface portion of the opening portion, respectively. Thus, the support member can be stably supported by the fixation member without rattling. In addition, the second lower surface portion of the insertion portion is sloped in the downward direction from the opening side toward the opposite side, and the slope angle thereof with respect to the horizontal direction is set to be smaller than the slope angle of the second front surface portion of the opening portion with respect to the horizontal direction. Therefore, the insertion portion can be easily attached to and detached from the opening portion.

In addition, since the second vertical surface portion of the insertion portion contacts with the first vertical surface portion of the opening portion, the support member can be further stably supported by the fixation member without rattling.

In addition, the length of the first front surface portion of the fixation member in the horizontal direction toward the opening side is set to be equal to or greater than four times the length of the first rear surface portion of the fixation member in the horizontal direction toward the opening side. Therefore, the insertion portion can be further easily attached to and detached from the opening portion.

In addition, the slope angles of the first front surface portion of the fixation member and the second front surface portion of the insertion portion with respect to the horizontal direction are set to 20 degrees, the slope angles of the first rear surface portion of the fixation member and the second rear surface portion of the insertion portion with respect to the horizontal direction are set to 30 degrees, and the slope angle of the second lower surface portion of the insertion portion with respect to the horizontal direction is set to 8 degrees. Therefore, the insertion portion can be further reliably attached to and detached from the opening portion, and the support member can be reliably supported by the fixation member without rattling.

In addition, since a plurality of opening portions are formed in series in the vertical direction in the fixation member, the support member can be inserted into any one of the plurality of opening portions formed in the vertical direction, and thus the degree of freedom in the height direction increases.

In addition, the fixation member is provided with a plurality of chip portions having the same shape, the lower surface of one chip portion forms the first upper surface portion of the opening portion, and the upper surface of another chip portion forms the first lower surface portion of the opening portion. Therefore, the support apparatus can be easily manufactured. In addition, the wiring portion can be easily arranged on the opposite side of the opening portion. In particular, this structure is suitable for, in the case where a plurality of opening portions are formed in series in the vertical direction, arranging the wiring portion to the respective opening portions.

In addition, the fixation member is formed with a plurality of chip portions held between two side plate portions, the first recess/protrusion portions continuously extending in the vertical direction are formed at the first side surface portion and the second side surface portion of the two side plate portions, and the second recess/protrusion portions to be fitted to the first recess/protrusion portions are formed at the side surfaces of the plurality of chip portions. Therefore, the plurality of chip portions are held between the two side plate portions such that the second recess/protrusion portions of each chip portion are fitted to the first recess/protrusion portions of the two side plate portions, and thus the fixation member has a simple structure that is excellent in strength.

In addition, the lengths of the first side surface portion and the second side surface portion of the opening portion of the fixation member in the horizontal direction toward the opening side are set to be greater than the lengths of the first upper surface portion and the first lower surface portion of the opening portion of the fixation member in the horizontal direction toward the opening side. Therefore, after the support apparatus is constructed, the structure inside the opening portion is hardly visible from the outside, and thus the support apparatus is excellent in design. In addition, in construction of the support apparatus, wall surface portions can be arranged on the outer sides of the first side surface portion and the second side surface portion, and thus the construction is facilitated.

In addition, the length of the receiving member in the height direction is set to be shorter than the length of the opening portion in the height direction. Therefore, the receiving member is not required to have a size increased more than necessary, and thus the degree of freedom in design increases and the support apparatus is excellent in design.

In addition, in a pair of the fixation members, their respective opening portions are formed at the same positions in the height direction, and a pair of the support members are inserted into a pair of the opening portions formed at the same position in the height direction. Therefore, a load placed across the pair of receiving members can be easily and stably supported without rattling.

In addition, in the fixation member, the wiring portion for transmitting power from the outside is provided at the first bottom surface portions of the opening portions, and the support member has, at its second bottom surface portion, the power supply portion which is to contact with the wiring portion to lead power to the outside from the opening side of the opening portion of the fixation member. Therefore, power can be led to the outside from the opening portion of the support apparatus.

In addition, the power supply portion is formed of: the spring electrode portion to contact with the wiring portion; and the lead wire portion. Therefore, the power supply portion can be easily formed.

Embodiment 2

FIG. 13 shows the structure of a part of a fixation member of a support apparatus in embodiment 2 of the present invention. FIG. 13(A) is a front view of a part of the fixation member, and FIG. 13(B) is a perspective view of a part of the fixation member. FIG. 14 shows the structure of a support member and a receiving member used with the fixation member shown in FIG. 13. FIG. 14(A) is a front view of the support member and the receiving member, FIG. 14(B) is a left side view of the support member and the receiving member, FIG. 14(C) is a right side view of the support member and the receiving member, FIG. 14(D) is a plan view of the support member and the receiving member, and FIG. 14(E) is a bottom view of the support member and the receiving member.

In the above embodiment 1, the example in which the opening portions 5 of the fixation member 2 are formed using the chip portions 6 has been shown. However, without limitation thereto, in the present embodiment 2, an intermediate plate portion 60 is used which forms a plurality of opening portions 5 integrally. In the drawings, the same parts as in the above embodiment 1 are denoted by the same reference characters, and the description thereof is omitted. In the present embodiment 2, instead of the chip portions 6, the intermediate plate portion 60 is held between the side plate portion 8 and the side plate portion 9 and is fixed by screwing or welding, whereby the fixation member 2 having the same opening portions 5 as those in the above embodiment 1 is formed. However, unlike the case of using the chip portions 6, the first bottom surface portions 56 of the plurality of opening portions 5 cannot be formed continuously in the vertical direction Y, and therefore the wiring portion is not provided at the first bottom surface portions 56.

In addition, the first front surface portion 511 of the first upper surface portion 51 of the opening portion 5 has a shorter length in the horizontal direction X than that in the above embodiment 1. Even in this case, a length W24 of the first front surface portion 511 in the horizontal direction X is about four times the length W13 of the first rear surface portion in the horizontal direction X. In addition, a length W34 of the second front surface portion 311 in the horizontal direction X toward the opening side X1 is about four times the length W3 of the second rear surface portion 312 in the horizontal direction X toward the opening side X1.

The support apparatus in embodiment 2 configured as described above can support a load on the receiving member in the same manner as in the above embodiment 1, though the load withstanding property is slightly deteriorated as compared to the above embodiment 1.

In addition, the fixation member is composed of: two side plate portions forming the first side surface portion and the second side surface portion; and one intermediate plate portion held therebetween and forming the other parts of the opening portions. Therefore, the support apparatus can be manufactured by a simple manufacturing method, and the cost thereof is reduced.

It is noted that, within the scope of the present invention, the above embodiments may be freely combined with each other, or each of the above embodiments may be modified or simplified as appropriate.

The invention claimed is:

1. A support apparatus comprising:
a fixation member having opening portions;
a support member detachably attached to the opening portion; and
a receiving member fixed to the support member and supporting a load, wherein
in the opening portion of the fixation member,
a first upper surface portion of the opening portion is formed of: a first front surface portion sloped in a downward direction from an opening side toward an opposite side; and a first rear surface portion formed continuously from the first front surface portion and sloped in an upward direction from the opening side toward the opposite side,
a first lower surface portion of the opening portion is sloped in parallel with the first front surface portion, and
a first side surface portion and a second side surface portion of the opening portion are formed in planar shapes,
the support member has an insertion portion to be inserted into the opening portion, and
in the insertion portion,
a second upper surface portion of the insertion portion is formed of: a second front surface portion to contact with the first front surface portion; and a second rear surface portion to contact with the first rear surface portion,
a second lower surface portion of the insertion portion is sloped in the downward direction from the opening side toward the opposite side such that the slope angle thereof with respect to a horizontal direction is smaller than the slope angle of the second front surface portion with respect to the horizontal direction, and the second lower surface portion is formed so as to contact with an opening-side end of the first lower surface portion, and
a third side surface portion and a fourth side surface portion of the insertion portion are formed so as to contact with the first side surface portion and the second side surface portion, respectively, wherein
a pair of the fixation members are provided,
the opening portions of the pair of fixation members are formed at the same position in the height direction,
a pair of the support members are provided which are to be inserted into a pair of the opening portions formed at the same position in the height direction in the pair of fixation members, and
a pair of the receiving members of the pair of the support members support a load placed across the pair of receiving members.

2. A support apparatus comprising:
a fixation member having an opening portion;
a support member detachably attached to the opening portion; and
a receiving member fixed to the support member and supporting a load, wherein
in the opening portion of the fixation member, a first upper surface portion of the opening portion is formed of: a first front surface portion sloped in a downward direction from an opening side toward an opposite side; and a first rear surface portion formed continuously from the first front surface portion and sloped in an upward direction from the opening side toward the opposite side, a first lower surface portion of the opening portion is sloped in parallel with the first front surface portion, and a first side surface portion and a second side surface portion of the opening portion are formed in planar shapes, the support member has an insertion portion to be inserted into the opening portion, and in the insertion portion, a second upper surface portion of the insertion portion is formed of: a second front surface portion to contact with the first front surface portion ; and a second rear surface portion to contact with the first rear surface portion, a second lower surface portion of the insertion portion is sloped in the downward direction from the opening side toward the opposite side such that the slope angle thereof with respect to a horizontal direction is smaller than the slope angle of the second front surface portion with respect to the horizontal direction, and the second lower surface portion is formed so as to contact with an opening-side end of the first lower surface portion, and a third side surface portion and a fourth side surface portion of the insertion portion are formed so as to contact with the first side surface portion and the second side surface portion, respectively.

3. The support apparatus according to claim 2, wherein the length of the first front surface portion of the fixation member in the horizontal direction toward the opening side is equal to or greater than four times the length of the first rear surface portion of the fixation member in the horizontal direction toward the opening side.

4. The support apparatus according to claim 2, wherein the slope angles of the first front surface portion of the fixation member and the second front surface portion of the insertion portion with respect to the horizontal direction are 20 degrees, the slope angles of the first rear surface portion of the fixation member and the second rear surface portion of the insertion portion with respect to the horizontal direction are 30 degrees, and the slope angle of the second lower surface portion of the insertion portion with respect to the horizontal direction is 8 degrees.

5. The support apparatus according to claim 2, wherein the fixation member comprises a plurality of opening portions having identical configurations as the opening portion, the plurality of opening portions and the opening portion being formed in series in a vertical direction.

6. The support apparatus according to claim 2, wherein the lengths of the first side surface portion and the second side surface portion of the opening portion of the fixation member in the horizontal direction toward the opening side are greater than the lengths of the first upper surface portion and the first lower surface portion of the opening portion of the fixation member in the horizontal direction toward the opening side.

7. The support apparatus according to claim 2, wherein the length of the receiving member in a vertical direction is smaller than the length of the opening portion in the vertical direction.

8. The support apparatus according to claim 2, wherein the fixation member is provided with a plurality of chip portions having the same shape, a lower surface of each chip portion forms the first upper surface portion of the opening portion, and an upper surface of another one of the chip portions forms the first lower surface portion of the opening portion.

9. The support apparatus according to claim 8, wherein the fixation member is composed of: two side plate portions forming the first side surface portion and the second side surface portion; and the plurality of chip portions held between the two side plate portions, first recess/protrusion portions extending continuously in the vertical direction are formed at the first side surface portion and the second side surface portion of the two side plate portions, second recess/protrusion portions to be fitted to the first recess/protrusion portions are formed at side surfaces of the plurality of chip portions, and the plurality of chip portions are held between the two side plate portions such that the second recess/protrusion portions are fitted to the first recess/protrusion portions.

10. The support apparatus according to claim 2, wherein the fixation member has a wiring portion which is provided at a first bottom surface portion on the side opposite to the opening side of the opening portion, and which transmits power from an external power supply, and the support member has a power supply portion at a second bottom surface portion thereof positioned on the side opposite to the opening side when the support member is attached to the fixation member, the power supply portion being configured to contact with the wiring portion and lead the power to outside from the opening side of the opening portion of the fixation member.

11. The support apparatus according to claim 10, wherein the power supply portion is formed of:

a spring electrode portion to contact with the wiring portion; and a lead wire portion connected to the spring electrode portion.

12. The support apparatus according to claim 2, wherein outside the opening portion in the fixation member, a first vertical surface portion is formed extending in the downward direction continuously from the first lower surface portion of the opening portion, and the support member has a second vertical surface portion which is formed continuously from the second lower surface portion of the insertion portion and which is to contact with the first vertical surface portion.

13. The support apparatus according to claim 12, wherein the length of the first front surface portion of the fixation member in the horizontal direction toward the opening side is equal to or greater than four times the length of the first rear surface portion of the fixation member in the horizontal direction toward the opening side.

14. The support apparatus according to claim 12, wherein the slope angles of the first front surface portion of the fixation member and the second front surface portion of the insertion portion with respect to the horizontal direction are 20 degrees, the slope angles of the first rear surface portion of the fixation member and the second rear surface portion of the insertion portion with respect to the horizontal direction are 30 degrees, and the slope angle of the second lower surface portion of the insertion portion with respect to the horizontal direction is 8 degrees.

15. The support apparatus according to claim 12, wherein the fixation member comprises a plurality of opening portions having identical configurations as the opening portion, the plurality of opening portions and the opening portion being formed in series in a vertical direction.

16. The support apparatus according to claim 12, wherein the lengths of the first side surface portion and the second side surface portion of the opening portion of the fixation member in the horizontal direction toward the opening side are greater than the lengths of the first upper surface portion and the first lower surface portion of the opening portion of the fixation member in the horizontal direction toward the opening side.

17. The support apparatus according to claim 12, wherein the length of the receiving member in the vertical direction is smaller than the length of the opening portion in the vertical direction.

18. The support apparatus according to claim 12, wherein the fixation member has a wiring portion which is provided at a first bottom surface portion on the side opposite to the opening side of the opening portion, and which transmits power from an external power supply, and the support member has a power supply portion at a second bottom surface portion thereof positioned on the side opposite to the opening side when the support member is attached to the fixation member, the power supply portion being configured to contact with the wiring portion and lead the power to outside from the opening side of the opening portion of the fixation member.

19. The support apparatus according to claim 12, wherein the fixation member is provided with a plurality of chip portions having the same shape, a lower surface of each chip portion forms the first upper surface portion of the opening portion, and an upper surface of another one of the chip portions forms the first lower surface portion of the opening portion.

20. The support apparatus according to claim 19, wherein the fixation member is composed of: two side plate portions forming the first side surface portion and the second side surface portion; and the plurality of chip portions held between the two side plate portions, first recess/protrusion portions extending continuously in the vertical direction are formed at the first side surface portion and the second side surface portion of the two side plate portions, second recess/protrusion portions to be fitted to the first recess/protrusion portions are formed at side surfaces of the plurality of chip portions, and the plurality of chip portions are held between the two side plate portions such that the second recess/protrusion portions are fitted to the first recess/protrusion portions.

* * * * *